United States Patent
Naraghi

[11] Patent Number: 6,063,334
[45] Date of Patent: May 16, 2000

[54] SULFUR BASED CORROSION INHIBITOR

[75] Inventor: Ali Naraghi, Missouri, Tex.

[73] Assignee: Champion Technologies, Inc., Fresno, Tex.

[21] Appl. No.: 09/036,076

[22] Filed: Mar. 6, 1998

[51] Int. Cl.$^7$ .................................................. C23F 11/10
[52] U.S. Cl. ................................. 422/7; 422/17; 422/16; 422/12; 166/902; 423/DIG. 8; 252/391
[58] Field of Search ..................... 422/12, 13, 7, 422/16, 17; 166/902; 423/DIG. 8; 510/255, 260, 261, 262, 263, 401; 252/402, 391

[56] References Cited

U.S. PATENT DOCUMENTS 3,556,994  1/1971  Diery et al. .
3,775,447  11/1973  Andrews et al. .
4,504,280  3/1985  Efner et al. .
4,566,897  1/1986  Horodysky .

*Primary Examiner*—Elizabeth McKane
*Attorney, Agent, or Firm*—Gunn & Associates, P.C.

[57] ABSTRACT

The present disclosure is concerned with inhibiting corrosion in metal, usually steel, equipment which is exposed to oil field production flow including gases, oil, water, and sand. It is injected into the aqueous stream and carried with it to contact and coat the metal surfaces. It includes a corrosion inhibitor including at least one sulfur amine based on the equation:

$$R-X(C_2H_4NZ)_nC_2H_4NY$$

In which R is a C12–36 hydrocarbon;

X is an amide-CO—NH— or 5 membered cyclic imidazoline ring;

Z is H or Y; Y is $SO_2$;

and $n$ is an integer from 1 to 8.

9 Claims, No Drawings

SULFUR BASED CORROSION INHIBITOR

BACKGROUND OF THE DISCLOSURE

Corrosive protective materials are known. Focusing on a particular field of application, prevention of corrosion is needed for steel pipelines which deliver a flowing fluid over great distances. It is not reasonably possible to permanently coat the interior of pipelines to thereby prevent rust or other products of corrosion from forming on the inside exposed wall. Most large diameter pipe is formed of ferrous materials. They are externally coated with various materials, an example being tar to protect the exterior. On the inside, however, corrosion does occur. Corrosion inhibitors are added to the flowing materials to reduce corrosion on the interior steel pipe wall.

The mix of materials flowing in the pipeline significantly changes the inhibition requirements. For example, oil field gathering lines are required to deliver the production flowing from a well. That production mix can give rise to serious problems. Varied paraffin and corrosive deposits may accumulate. Oxidation is reduced if the well produces only hydrocarbon products. However, most producing wells produce at least some portion of water along with natural gas mixed in the oil. Sometimes, the pressure drop from formation pressure to the pressure maintained in the pipeline enables lighter molecules to separate into phases, thereby flowing a mix of bubbles in liquid. The entrained gases typically will include $CO_2$ and other gases common to a given producing formation.

All the foregoing often occurs also in the presence of produced sand. Producing formations are typically consolidated sand formations. Sometimes the sands are not well consolidated so that various and sundry sand particles are produced. These vary in size, sharpness and concentration. It is not uncommon for a producing formation to deliver sand particles which are carried along with the flow. Sand particles in the produced multiphase flow from an oil field abrasively polish the pipe surface, thereby damaging any corrosion inhibitor coating on the pipe.

Corrosion inhibitors placed in the flowing stream must have some affinity for the metal pipe. While the bond between the inhibitor and the pipe may vary, the mixed phase flow (with little, or a lot of sand) has a scrubbing or scouring impact which ranges from trivial to severe. In this disclosure, a corrosion inhibitor is set forth which can be used with most mixed phase flows in the oil field production stream. The flowing stream can readily destroy any surface pipe. Thereafter, the exposed steel pipe will corrode rapidly and form an excess of unwanted corrosion products. Accordingly, corrosion inhibition involves the formation of a first bond between the exposed steel pipe surface and the inhibitor, and then a second bond between the inhibitor and the attacking molecules in the stream. In the latter event, they will be denoted simply as corrosive agents which are characterized by available oxygen, i.e., the ultimate corrosive agent. The two bonds are noted in the discussion found below.

It has been known heretofore that the first bond is accomplished by a class of amine derived products to be described in greater detail below. The modified amines have a high affinity for the ferrous surface so that the first bond necessary to obtain protection is readily accomplished. Moreover, the amines of this class are characterized in that they have an available —N site for bonding. While it is valuable to make a bond at the —N site on the amine molecule or complex, that is not always easily accomplished because nitrogen does not readily accept chemical bonds. The reluctance of this bond is well documented in that it requires greater energy levels to accomplish. The —N bond has to be converted so that the antioxidant connected at that site provides the requisite protection against the available oxidants flowing in the stream.

This kind of bond can be obtained from phosphates, to pick an example which is detailed in Applicant's Pat. Nos. 5,611,991 and 5,661,992. In brief summary, these are directed to corrosion inhibitors which are characterized as phosphate esters. That is a highly successful inhibitor featuring phosphate as the antioxidant agent in the content of the corrosion inhibitor successfully applied in ferrous pipelines. The present disclosure, however, sets forth a much more desirable sulfur based corrosion inhibitor having significant advantages. One important advantage is the relative cost. In general terms, the cost of the inhibitor of the present disclosure is approximated by three major factors which are the cost of the amine complex, the cost of the antioxidant agent added to it and the utilities cost involved in making the corrosion inhibitor.

This disclosure sets forth a sulfur based corrosion inhibitor which is significantly less costly. Cost is reduced because the sulfur added is provided in a form that is quite inexpensive, the preferred being sulfur dioxide ($SO_2$). Better than that, the utilities involved in plant operation for sulfur conversion are reduced significantly. As an important aspect of utility cost, sulfur products are easier and safer to manufacture in that they tend to be only slightly noxious and are generally not poisonous at the prevailing process conditions including conversion pressures and temperatures.

One aspect of this process is the synthesis of an amine which is easily bonded to the exposed ferrous surface in the pipeline along with a —N bond site available which bond is converted into an S—N bond thereby enabling the defeat of available oxygen bonds which would otherwise trigger corrosion of the ferrous surface exposed in the pipeline. Therefore, corrosion is resisted and the life of the equipment is extended significantly. This is effective at a reduced cost and yet appears to have a desirable, perhaps an even better bond to the ferrous surface. It can be used in benign conditions but it can also be used with the most aggressive circumstances, i.e., flowing multiple phase well fluids with sand particles of all sizes and shapes.

The present disclosure sets forth the improved corrosion inhibitor featuring a sulfur based active agent. The sulfur bonded amine of the present disclosure is less costly; it is also less costly to make and is made in more desirable circumstances.

The procedure of making the present disclosure involves the preparation in a first step of a specified amine structure, and the subsequent addition of sulfur in the form of $SO_2$ that is sparged through the solution at temperatures of up to about 150–190° F. at a slow rate to obtain batch conversion in a time of about 90 to 120 minutes whereupon the sulfur based inhibitor is delivered in a water soluble solution ready to be used. The conversion process is relatively simple and has reduced utility cost as a result of the shorter intervals and lower temperatures.

DETAILED DESCRIPTION OF THE PREFERRED EMBODIMENT

This disclosure is directed to compounds and compositions which are useful for the inhibition of corrosion of ferrous metal surfaces both in aqueous and nonaqueous media.

The present invention provides compounds which are the products of a condensation reaction between C12–36 fatty acids, with preferably at least 18 carbon atoms per molecule and an alkyl amine, subsequently reacted with $SO_2$ in a nonaqueous medium.

The present invention therefore provides an amine derivative which can be represented by this formula:

In which R is a C12–36 hydrocarbon;

X is an amide-CO—NH— or 5 membered cyclic imidazoline ring;

Z is H or Y; Y is $SO_2$;

and $n$ is an integer from 1 to 8.

The amount of sulfur dioxide used to produce this compound should contain at least one $SO_2$ group so that preferably all the basic nitrogen atoms are reacted with $SO_2$, i.e., one mole of each.

The alkyl amines are selected to give the appropriate heterocyclic ring and/or amide group or groups, if desired, alkyl amine group attached to the heterocyclic ring or amide. Suitable and preferred alkyl amine include such as diethylentriamine (DETA), triethylenetetraamine (TETA), aminoethylethanolamine (AEEA), tetraethylenpentaamine (TEPA), aminoethylpiperazine (AEP) and ethylenediamine (EDA).

In the foregoing, the R is a hydrocarbon having between about 12 and about 36 carbons, and the preferred is about 18 or more carbons and can be either straight chains or isomers. Molecules larger than 36 carbons generally are not needed, and are somewhat less effective due to the size of the complex. The amine derivative in its simplest form has two available —N sites. The process exemplified below is optimum if both sites are provided with $SO_2$; in some instances, only one site may convert to the $SO_2$ thereby establishing the desired S—N bond. However, the amount of $SO_2$ added in the process is preferably increased so that the conversion process is accomplished at both —N sites. In the foregoing amine derivative definition, the integer n can range between 1 and 8, and the preferred value is about 3. With the preferred form, the total number of —N bonding sites is n plus 1, or about four —N bonding sites in the preferred amine derivative. At the time of adding the $SO_2$, the moles of $SO_2$ added are adjusted so that most of the —N sites are converted. Examples of this conversion will be given below.

EXAMPLE 1

290 grams (1.0) mole) of tall oil were added to 103 grams (1.0 mole) of diethylentriamine (DETA). Once the addition was complete, the temperature was increased over time to 360° F. After 3 hours of the reaction, 18 grams (1.0 mole) of water vapor had been removed from the mixture. The resulting product was amide.

The temperature was next increased to 480° F. to drive off the second mole of water vapor to form the resultant imidazoline. 150 grams of TOFA (tall oil fatty acid)/DETA amide or imidazoline were dissolved in 60 grams 50/50 mixture of methanol and isopropyl alcohol and stirred at 120° F. To this solution, sulfur dioxide ($SO_2$) gas was slowly and carefully bubbled through the solution. A temperature rise from 120° F. to 160° F. was observed from the exothermic reaction. The reaction was monitored to completion in about 2 hours. Reaction completion occurred when a minimum of one mole of $SO_2$ reacted with the TOFA/DEA amide made after one mole of water was removed or the imidazoline made after the second mole of water was removed. Example 1 can be done also with TETA only or a mix of the DETA and TETA in any ratio.

EXAMPLE 2

Following the procedure outlined in Example 1, 189 grams (1 mole) of tetraethylenepentaamine (TEPA) were reacted with 580 grams of TOFA. The final products were reacted with one mole of $SO_2$.

EXAMPLE 3

Following the procedure outlined in Example 1, 146 grams of triethylenetetraamine (TETA), which is a mixture of linear, branch, and cyclic methods including linear TETA were reacted with one mole of TOFA. The reaction results were reacted with a minimum of one mole of $SO_2$.

EXAMPLE 4

Following the procedure outlined in Example 1, one mole of aminoethylpiperazine was reacted with one mole of TOFA. The final products were reacted with one mole of $SO_2$.

EXAMPLE 5

Following the procedure outlined in Exhibit 1, one mole of aminoethylethanolamine was reacted with one mole of TOFA. The final products were reacted with one mole of $SO_2$.

EXAMPLE 6

The reaction products of one mole tallow amine with one mole of $SO_2$ were made.

EXAMPLE 7

Reaction products of one mole tallow diamine with two moles of $SO_2$ were made.

EXAMPLE 8

Following the procedure outlined in Exhibit 1, one mole of a mixture of AEEA/TETA was reacted with one mole of TOFA. The final products were reacted with one mole of $SO_2$.

CORROSION INHIBITING TESTS

Corrosion inhibition was measured using rotating cylinder electrode (RCE). The RCE allows the inhibitor to be evaluated under dynamic conditions. The test is started by purging the brine and hydrocarbon (a mix to simulate produced oil flowing in a gathering line) with $CO_2$ to reduce the oxygen down to <20 ppb. The fluids are then heated to 170° F. A cylindrical coupon mounted on a shaft is then inserted into the fluids. The rotation speed is set and a blank (uninhibited) corrosion rate measured for approximately 2 hours. The rotation speed was set at 4000 rpm.

Linear polarization resistance (LPR) technique was used to evaluate these reactions, and the data were automatically recorded in the data collection computer. After the blank corrosion rate was recorded, the corrosion inhibitor was injected into the fluids at 5 to 10 ppm. The decline in corrosion rate was recorded over a period of 18 hours. Percentage protection values were calculated at 2 hours and 18 hours after the addition of the inhibitor.

The foregoing test procedures are intended to simulate the corrosion rate on the steel pipeline wall which is not protected, hence the blank defines the maximum rate of corrosion. Corrosion is normally given in mills per year (mpy) which refers to the rate at which the ferrous material in the pipe is removed and the pipe wall is thereby weakened. The corrosion rate represents cumulative annual damage. Even If the pipe has substantial thickness, corrosion over a period of time can not be tolerated. However, corrosion dooms the pipe to premature replacement without corrosion protection. Corrosion protection is highly desirable so that the pipe is not damaged prematurely, well short of its intended service life. The corrosion inhibitor of the present disclosure is intended to reduce the corrosion rate significantly so that the life of the pipe (hence the pipeline) is extended greatly. The test data given in Table 1 therefore include a corrosion rate for the blank prior to protection with the corrosion inhibitor. The last column of Table 1 lists the amount of protection that is accomplished by the inhibitor. In every instance, the exemplary composition from the eight examples listed above was combined with one mole equivalent of $SO_2$. Therefore, a high level of protection was obtained. This Table does not include any examples combined with two or more mole equivalents of $SO_2$. It is conjectured that the level of protection in that event will be just as good and probably even better as a result of the increased $SO_2$ content.

TABLE 1

| Example composition | blank mpy corrosion rate | % protection |
|---|---|---|
| 1) TOFA/TETA amide or imidazoline | 280 | 97.8 |
| 2) TOFA/TEPA | 320 | 98.7 |
| 3) TOFA/TETA | 298 | 96.9 |
| 4) TOFA/AEP | 312 | 97.9 |
| 5) TOFA/AEEA | 287 | 94.8 |
| 6) TOFA/tallow amine | 161 | 96.0 |
| 7) TOFA/TDA | 136 | 88.0 |
| 8) TOFA/AEEA&TETA | 309 | 97.5 |

A review of Table 1 shows that one mole equivalent of $SO_2$ provides sufficient protection in every instance. Moreover, the corrosion rate is reduced so that the service life of the pipeline is longer by many years. Typically, the pipeline will be protected for fifty years or greater by the continued use of this corrosion inhibitor. The corrosion inhibitor of the present disclosure is used to advantage in the flowing materials. The inhibitor seems to be effective in preventing corrosion and is able to provide the desired protection in relative extreme conditions, namely, elevated temperature and relative high velocity of the flowing fluid. On the latter fact, there seems to be some mechanical aspect to the corrosion. To be sure, most pipelines are continuously pumped although they may be shut down momentarily for short intervals. When maintaining a continuous flow in the pipeline, and by operating the pipeline at any ambient temperature (cold in northern latitudes to hot where the pipeline crosses desert regions), the corrosion inhibitor is effective to retard loss of metal. Moreover, if the corrosion rate is reduced to only 5 or 10 mpy, the life of the pipeline is extended to 50 years or greater, sufficiently long that the pipeline will outlast the producing oil well connected to it. The corrosion inhibitor of this disclosure is effective with and without sand particles. To the extent that entrained sand particles will scour the inhibitor from the surface, more inhibitor can be added to help compensate for the loss as a result of the scouring action.

The corrosion inhibitor is water soluble so that it goes into the water droplets carrying the inhibitor within the droplets. The inhibitor and corrosive agents come into contact in the water droplets. The inhibitor has an affinity for the water; since the water (and materials dissolved in it) cause most corrosion, the inhibitor is added, more or less, in proportion to the water. Large water flow levels require more inhibitor while small flow levels require less. A range of inhibitor is about 2 to 100 ppm with about 5 to 15 ppm being preferred.

While the foregoing is directed to the preferred embodiment, the scope thereof is determined by the claims which follow.

I claim:

1. A method of inhibiting corrosion of metal process equipment in an oil field corrosive environment comprising the step of introducing into an aqueous environment an effective amount of corrosion inhibitor comprising at least one sulfur based amine derivation defined by the equation:

In which R is a C12–36 hydrocarbon;

X is an amide-CO—NH— or 5 membered cyclic imidazoline ring;

Z is H or Y; Y is $SO_2$;

and $n$ is an integer from 1 to 8.

2. The method of claim 1 further comprising the step of maintaining an effective concentration of the inhibitor for substantially preventing corrosion of metals.

3. The method of claim 2 wherein the metal is a ferrous metal.

4. The method of claim 1 wherein about 2 ppm to about 100 ppm corrosion inhibitor are introduced into the corrosive environment.

5. The method of claim 4 wherein about 5 ppm to about 15 ppm corrosion inhibitor are introduced into the corrosive environment.

6. A method of inhibiting corrosion of metal surfaces in an oil field corrosive environment comprising the step of contacting a metal surface with an aqueous stream containing an effective amount of a corrosion inhibitor comprising:

a water soluble fatty acid with more than about 12 carbons, an amine derivative having a —N bonding site, and a sulfur atom bonded to the —N bonding site, and the water soluble fatty acid is defined by the equation R—X ($C_2H_4NZ)_nC_2H_4NSO_2$ wherein R is a 12 to 36 hydrocarbon;

X is an amide-CO—NH— or 5 membered cyclic imidazoline ring;

Z is H or $SO_2$; and $n$ is an integer from 1 to 8.

7. The method of claim 6 wherein the inhibitor includes at least two $SO_2$ groups bonded to —N sites, and $n$ is about 3.

8. The method of claim 7 wherein about 2 ppm to about 100 ppm corrosion inhibitor are introduced into the corrosive environment.

9. The method of claim 8 wherein about 5 ppm to about 15 ppm corrosion inhibitor are introduced into the corrosive environment.

* * * * *